US010678931B2

(12) United States Patent
Liu et al.

(10) Patent No.: US 10,678,931 B2
(45) Date of Patent: Jun. 9, 2020

(54) REGULATING BLOCKCHAIN CONFIDENTIAL TRANSACTIONS

(71) Applicant: Alibaba Group Holding Limited, George Town (KY)

(72) Inventors: Zheng Liu, Hangzhou (CN); Lichun Li, Hangzhou (CN); Huazhong Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,826

(22) Filed: Apr. 22, 2019

(65) Prior Publication Data
US 2019/0251270 A1 Aug. 15, 2019

Related U.S. Application Data

(63) Continuation of application No. PCT/CN2018/114314, filed on Nov. 7, 2018.

(51) Int. Cl.
*G06F 21/60* (2013.01)
*H04L 9/06* (2006.01)
(Continued)

(52) U.S. Cl.
CPC .......... *G06F 21/602* (2013.01); *H04L 9/0618* (2013.01); *H04L 9/0637* (2013.01);
(Continued)

(58) Field of Classification Search
CPC ......... G06F 21/60; G06F 21/602; H04L 9/32; H04L 9/08; H04L 29/06; H04L 9/06;
(Continued)

(56) References Cited

U.S. PATENT DOCUMENTS 10,299,113 B1 * 5/2019 Viswanathan .......... H04W 8/28
2012/0209790 A1 8/2012 Szydlo
(Continued)

FOREIGN PATENT DOCUMENTS

CN 106982205 7/2017
CN 107566337 1/2018
(Continued)

OTHER PUBLICATIONS

Corda.net [online], "Corda: An Open Source Blockchain Platform for Businesses," Corda Home Page, available on or before Jul. 2019, [retrieved on Jul. 10, 2019], retrieved from: URL<https://www.corda.net/>, 7 pages.
Fisco.com.cn [online], "Financial Blockchain Shenzhen Consortium," Fisco Home Page, available on or before Jul. 2019, [retrieved on Jul. 10, 2019], retrieved from: URL<https://www.fisco.com.cn>, 2 pages.
(Continued)

*Primary Examiner* — Jayesh M Jhaveri
(74) *Attorney, Agent, or Firm* — Fish & Richardson P.C.

(57) ABSTRACT

Implementations of the present disclosure include obtaining, by a client node of a blockchain network, a public key of a regulator node; generating, by the client node, one or more commitment values of a confidential transaction of the client node by applying a cryptographic commitment scheme to transaction data of the confidential transaction; generating, by the client node, encrypted regulatory information of the confidential transaction by encrypting the transaction data using the public key of the regulator node; and transmitting, by the client node to a consensus node of the blockchain network, a content of the confidential transaction for execution, wherein the content of the confidential transaction includes: the one or more commitment values; the encrypted regulatory information; and one or more zero-knowledge proofs of the transaction data.

20 Claims, 5 Drawing Sheets

(51) Int. Cl.
    *H04L 9/32*     (2006.01)
    *H04L 9/08*     (2006.01)
    *H04L 29/06*     (2006.01)

(52) U.S. Cl.
    CPC .......... *H04L 9/0825* (2013.01); *H04L 9/3218* (2013.01); *H04L 9/3247* (2013.01); *H04L 63/123* (2013.01); *H04L 9/06* (2013.01); *H04L 2209/16* (2013.01)

(58) Field of Classification Search
    CPC . H04L 9/0618; H04L 9/09637; H04L 9/0825; H04L 9/3218; H04L 9/3247; H04L 63/123; H04L 2209/16
    See application file for complete search history.

(56) References Cited

U.S. PATENT DOCUMENTS

| | | | |
|---|---|---|---|
| 2016/0156595 | A1 | 6/2016 | Wu et al. |
| 2016/0162897 | A1 | 6/2016 | Feeney |
| 2016/0358165 | A1* | 12/2016 | Maxwell ............ G06Q 20/3829 |
| 2017/0048209 | A1 | 2/2017 | Lohe et al. |
| 2017/0289111 | A1* | 10/2017 | Voell ................... H04L 63/0435 |
| 2017/0346833 | A1 | 11/2017 | Zhang |
| 2017/0366357 | A1* | 12/2017 | Pattanaik .............. H04L 63/062 |
| 2018/0121909 | A1* | 5/2018 | Christidis ............ G06Q 20/383 |
| 2018/0183768 | A1* | 6/2018 | Lobban ............... H04L 63/0435 |
| 2018/0191503 | A1 | 7/2018 | Alwar et al. |
| 2018/0227116 | A1 | 8/2018 | Chapman et al. |
| 2018/0367298 | A1 | 12/2018 | Wright et al. |
| 2019/0036906 | A1* | 1/2019 | Biyani ................ H04L 63/0807 |
| 2019/0109713 | A1* | 4/2019 | Clark ..................... H04L 9/3226 |
| 2019/0182055 | A1* | 6/2019 | Christidis ............. H04L 9/3297 |
| 2019/0251558 | A1 | 8/2019 | Liu et al. |
| 2019/0273610 | A1* | 9/2019 | Fan ....................... H04L 9/0869 |

FOREIGN PATENT DOCUMENTS

| | | |
|---|---|---|
| CN | 107666388 | 2/2018 |
| CN | 107833135 | 3/2018 |
| CN | 108021821 | 5/2018 |
| CN | 108418689 | 8/2018 |
| CN | 108418783 | 8/2018 |
| CN | 108492105 | 9/2018 |
| CN | 108712261 | 10/2018 |
| CN | 108764874 | 11/2018 |
| CN | 108769173 | 11/2018 |
| EP | 3499847 | 6/2019 |
| JP | 6293245 | 3/2018 |
| JP | 2018165977 | 10/2018 |
| RU | 2663476 | 8/2018 |
| WO | WO 2018008202 | 1/2018 |
| WO | WO 2018109010 | 6/2018 |

OTHER PUBLICATIONS

Inpher.io [online], "Inpher Secret Computing," Inpher Home Webpage, [retrieved on May 24, 2019], retrieved from: URL<https://www.inpher.io/>, 7 pages.
Usenix.org [online], "zkLedger: Privacy-Preserving Auditing for Distributed Ledgers," NSDI: Conference 2018, available on or before Jul. 2019, [retrieved on Jul. 10, 2019], retrieved from: URL<https://www.usenix.org/conference/nsdi18/presentation/narula>, 3 pages.
Wanchain.org [online], "Build the Future of Finance," Wanchain Home Page, available on or before Jul. 2019, [retrieved on Jul. 10, 2019], retrieved from: URL<https://wanchain.org/>, 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Patent Application No. 18866054.2, dated Oct. 30, 2019, 10 pages.
International Search Report and Written Opinion in International Application No. PCT/CN2018/114314, dated Aug. 7, 2019, 8 pages.
International Search Report and Written Opinion in International Application No. PCT/CN2018/114322, dated Jul. 30, 2019, 8 pages.
White, "How Computers Work," Introduction and Part 1 Overview, 7th Edition, Que, Oct. 2003, 23 pages.
Extended European Search Report in European Application No. 18866460.1, dated Dec. 4, 2019, 10 pages.
Fuchita, "Blockchain and Innovation in Financial Transactions," Nomura Capital Markets Quarterly, Nov. 2015, 3 pages (with English translation).
Linder, "DEcryption Contract ENforcement Tool (Decent): A Practical Alternative to Government Decryption Backdoors," IACR International Association For Cryptologic Research, Mar. 2016, 20160401:160351, pp. 1-18.
Naganuma et al., "Auditable Zerocoin," 2017 Symposium on Cryptography and Information Security, Jan. 2017, 6 pages (with English abstract only).
Kim et al., "Security Model of Smart Contract Based Private BlockChain Using Commitment Scheme," Journal of The Korea Contents Association, Jul. 2019, 18(7):620-627 (with English abstract).
Poelstra, scalingbitcoin.org [online], "Mimblewimble," Oct. 2016, retrieved on Feb. 3, 2020, retrieved from URL<https://scalingbitcoin.org/he/papers/mimblewimble.pdf>, 19 pages.
Tistory.com [online], "[blockchakin] What is zero-knowledge proof?," retrieved on Feb. 3, 2020, retrieved from URL<https:crazia,tistrory.com/entry/blockchain-%EC%98%81%EC%A7%80%EC%8B%9D%EC%A6%9D%EB%AA%85zeroknowledgeproof-%EB%9E%80>, 4 pages (with machine translation).
Tistory.com [online], "Bitcoin Transactions and Mining," Jun. 2017, retrieved on Feb. 3, 2020, retrieved from URL<https://sancs.tistory.com/162>, 11 pages (with machine translation).

* cited by examiner

REGULATING BLOCKCHAIN CONFIDENTIAL TRANSACTIONS

CROSS-REFERENCE TO RELATED APPLICATIONS

This application is a continuation of PCT Application No. PCT/CN2018/114314, filed on Nov. 7, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Blockchains are used in crypto-currency networks, which enable participants to conduct transactions to buy/sell goods, and/or services using a crypto-currency. A common crypto-currency includes Bitcoin. In crypto-currency networks, record-keeping models are used to record transactions between users. Example record-keeping models include an unspent transaction output (UTXO) model, and account model (also referred to as account-based model or account/balance model).

In the UTXO model, the assets on the chain are in the form of transactions. Each transaction spends output from prior transactions and generates new outputs that can be spent in subsequent transactions. A user's unspent transactions are tracked, and a balance that the user has to spend is calculated as the sum of the unspent transactions. Each transaction takes one or more unspent outputs (and only unspent outputs) as input and can have one or more outputs. The requirement that only unspent outputs may be used in further transactions is necessary to prevent double spending and fraud. The UTXO model supports the transaction validation and proof function, but the support for smart contracts is weak.

The account model is adopted by Ethereum. The account model performs record-keeping and manages account balances like a traditional bank. Under this model, an account can have an address and a corresponding account balance. Assets on the chain are represented as the balance of the account. Each transfer transaction can have an account address of a transferred asset and an account address of a received asset. The transaction amount is directly updated on the balance of the account. The account model is efficient as each transaction may only need to validate that the sending account has enough balance to pay for the transaction. In addition to supporting the transaction validation and proof function, the account model can fully support smart contracts, especially those that require state information or involve multiple parties.

SUMMARY

Implementations of the present disclosure include computer-implemented methods for confidential transactions based on blockchain technologies (referred to as blockchain confidential transactions or, simply, confidential transactions). More particularly, implementations of the present disclosure are directed to regulating blockchain confidential transactions.

In some implementations, actions include obtaining, by a client node of a blockchain network, a public key of a regulator node; generating, by the client node, one or more commitment values of a confidential transaction of the client node by applying a cryptographic commitment scheme to transaction data of the confidential transaction; generating, by the client node, encrypted regulatory information of the confidential transaction by encrypting the transaction data using the public key of the regulator node; and transmitting, by the client node to a consensus node of the blockchain network, a content of the confidential transaction for execution, wherein the content of the confidential transaction includes: the one or more commitment values; the encrypted regulatory information; and one or more zero-knowledge proofs of the transaction data. Other implementations include corresponding systems, apparatus, and computer programs, configured to perform the actions of the methods, encoded on computer storage devices.

In some implementations, actions include generating, by a regulator node of a blockchain network, a pair of a public key and a private key; publishing, by the regulator node, the public key to a plurality of client nodes of the blockchain network; obtaining, by the regulator node from a consensus node of the blockchain network, a content of a confidential transaction of a client node, wherein the content of the confidential transaction includes: one or more commitment values of the confidential transaction generated by the client node by applying a cryptographic commitment scheme to transaction data of the confidential transaction; one or more zero-knowledge proofs of the transaction data; and encrypted regulatory information generated by the client node by encrypting the transaction data using the public key of the regulator node; obtaining the transaction data by decrypting the encrypted regulatory information using the private key of the regulator node; and verifying, by the regulator node, that the confidential transaction is legitimate based on the content of the confidential transaction and the decrypted transaction data.

These and other implementations may each optionally include one or more of the following features.

A first feature, combinable with any of the following features, wherein the transaction data of the confidential transaction includes one or both of an account balance of the client node before the confidential transaction or a transaction amount of the confidential transaction.

A second feature, combinable with any of the previous or following features, wherein the one or more zero-knowledge proofs of the transaction data includes one or more zero-knowledge range proofs that values of the transaction data are within respective ranges.

A third feature, combinable with any of the previous or following features, wherein the one or more zero-knowledge proofs of the transaction data includes a zero-knowledge proof that the client node uses the public key of the regulator node in generating the encrypted regulatory information of the confidential transaction.

A fourth feature, combinable with any of the previous or following features, wherein the cryptographic commitment scheme includes a Pedersen Commitment scheme; wherein generating one or more commitment values of a confidential transaction of the client node by applying a cryptographic commitment scheme to transaction data includes generating the one or more commitment values of the confidential transaction of the client node based on the transaction data and random numbers corresponding to the transaction data; and wherein generating encrypted regulatory information of the confidential transaction includes generating encrypted regulatory information of the confidential transaction by encrypting the transaction data and random numbers corresponding to the transaction data using the public key of the regulator node.

A fifth feature, combinable with any of the previous or following features, wherein the content of the confidential transaction further includes a digital signature of the client node.

A sixth feature, combinable with any of the previous or following features, wherein verifying that the confidential transaction is valid based on the content of the confidential transaction and the decrypted transaction data includes one or more of: determining that the one or more commitment values are correct based on the commitment scheme; verifying the one or more zero-knowledge proofs of the transaction data; or determining that values of the transaction data comply with regulation.

A seventh feature, combinable with any of the previous or following features, wherein verifying the one or more zero-knowledge proofs of the transaction data includes one or more of: determining that an account balance of the client node before the confidential transaction is larger than zero; determining that a transaction amount of the confidential transaction is larger than zero; and determining that a transaction amount of the confidential transaction is less than or equal to an account balance of the client node before the confidential transaction.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
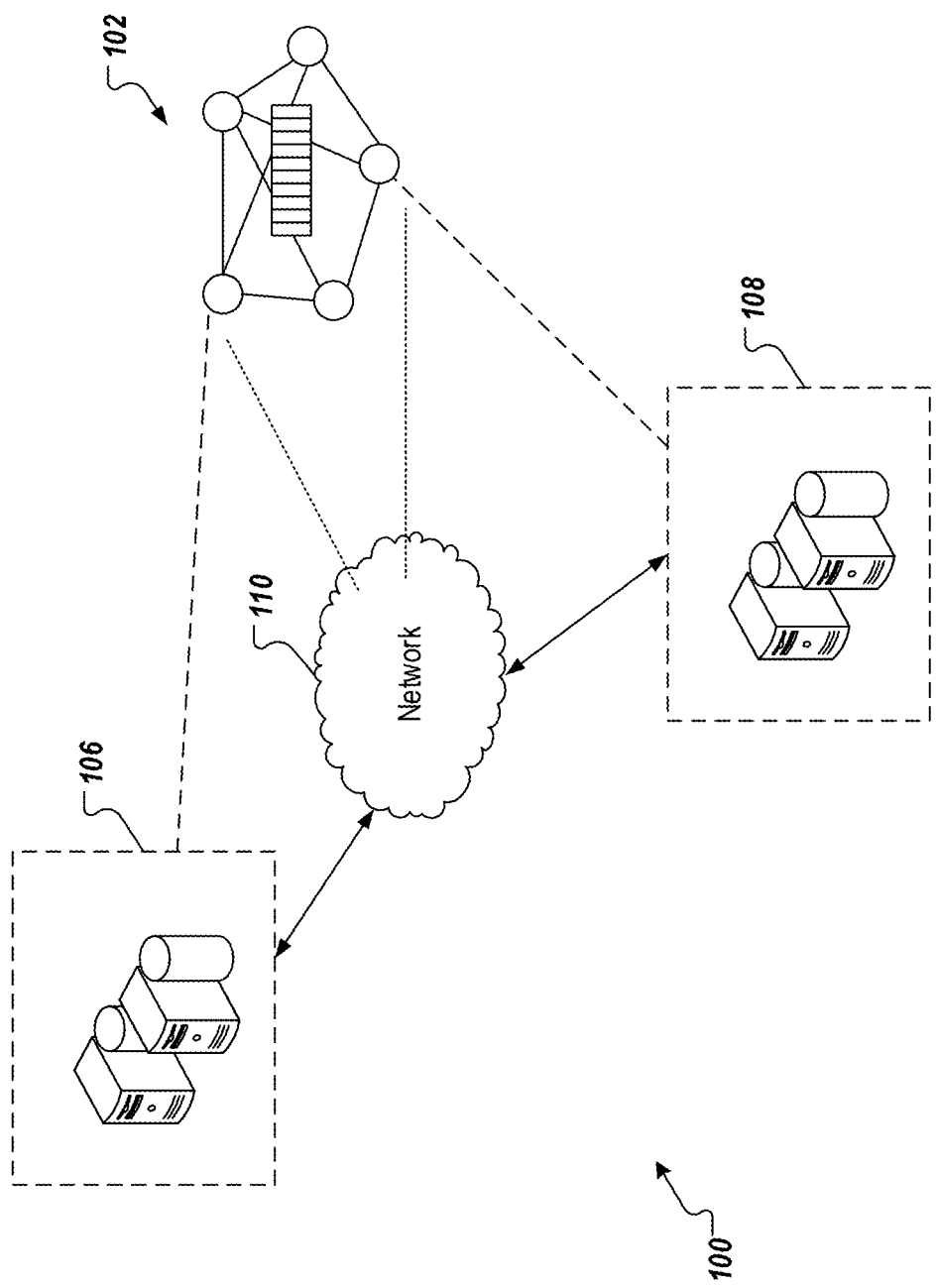
FIG. 1 depicts an example environment that can be used to execute implementations of the present disclosure.

Implementations of the present disclosure include computer-implemented methods for confidential transactions based on blockchain technologies (referred to as blockchain confidential transactions or, simply, confidential transactions). More particularly, implementations of the present disclosure are directed to regulating blockchain confidential transactions.

In some implementations, actions include obtaining, by a client node of a blockchain network, a public key of a regulator node; generating, by the client node, one or more commitment values of a confidential transaction of the client node by applying a cryptographic commitment scheme to transaction data of the confidential transaction; generating, by the client node, encrypted regulatory information of the confidential transaction by encrypting the transaction data using the public key of the regulator node; and transmitting, by the client node to a consensus node of the blockchain network, a content of the confidential transaction for execution, wherein the content of the confidential transaction includes: the one or more commitment values; the encrypted regulatory information; and one or more zero-knowledge proofs of the transaction data.

In some implementations, actions include generating, by a regulator node of a blockchain network, a pair of a public key and a private key; publishing, by the regulator node, the public key to a plurality of client nodes of the blockchain network; obtaining, by the regulator node from a consensus node of the blockchain network, a content of a confidential transaction of a client node, wherein the content of the confidential transaction includes: one or more commitment values of the confidential transaction generated by the client node by applying a cryptographic commitment scheme to transaction data of the confidential transaction; one or more zero-knowledge proofs of the transaction data; and encrypted regulatory information generated by the client node by encrypting the transaction data using the public key of the regulator node; obtaining the transaction data by decrypting the encrypted regulatory information using the private key of the regulator node; and verifying, by the regulator node, that the confidential transaction is legitimate based on the content of the confidential transaction and the decrypted transaction data.

Other implementations include corresponding systems, apparatus, and computer programs, configured to perform the actions of the methods, encoded on computer storage devices.

To provide further context for implementations of the present disclosure, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network. It is contemplated, however, that implementations of the present disclosure can be realized in any appropriate type of blockchain network.

Implementations of the present disclosure are described in further detail herein in view of the above context. More particularly, and as introduced above, implementations of the present disclosure are directed to regulating blockchain confidential transactions.

A blockchain is a tamper-proof, shared digital ledger that records transactions in a public or private peer-to-peer network. The ledger is distributed to all member nodes in the network, and the history of asset transactions occurring in the network is permanently recorded in the block. Since the ledger is entirely public to the participating entities, the blockchain ledger itself has no privacy protection function and requires additional technology to protect the privacy of the content of asset transaction.

Techniques for privacy protection for blockchain can include those for realizing a confidential transaction to protect privacy of a content of a transaction. In a confidential transaction, the content of a transaction is only accessible or known by participants of the transaction, not any other outsiders. For example, a confidential transaction allows only the two parties partaking in the transaction to be privy to the amount being transacted, and outside observers are prevented from knowing this information. Such techniques for realizing confidential transactions have been used, for example, in MONERO and ZCASH.

Techniques for privacy protection for blockchain can also include those for protecting identities of parties to a transaction can be realize, for example, using a stealth address or a ring signature mechanism.

With privacy protection added to the blockchain (for example, in the context of confidential transactions), it is difficult for one or more regulators (such as government, industry associations, etc.) to audit, exam, inspect, supervise, or otherwise regulate the transactions. For example, it is difficult for a regulator (or supervisor) in a consortium blockchain network to check formality and validity of the content of confidential transaction because the information of the transaction stored on the blockchain is encrypted, which would limit the applications of the blockchain.

Example techniques are described to solve the problem to make it possible and easier for the regulator to regulate the content on the blockchain, especially in the case of blockchain confidential transactions. The example techniques can be based on the account model and have the advantages of supporting smart contracts.

For example, when submitting a confidential transaction, a user can encrypt both a random number and a plaintext value (e.g., an account balance before the confidential transaction or a transfer amount of the confidential transaction) corresponding to the Pedersen Commitment in the transaction (described in greater detail below), and can use a public key of the regulator to encrypt and submit it as part of the transaction data. The regulator can use its private key to decrypt the Pedersen Commitment for each transaction at any time, thus determining whether each transaction meets regulatory requirements without any additional chain interactions such as sending a query to each participant in the chain at the time of the audit, receiving returned results from each participant to analyze the returned result to verify each transaction.

The proposed techniques can preserve the de-centralized property of the blockchain and do not require a central node or a third party, for example, that is relied on in a group signature-based technology or other techniques in implementing a regulatory solution in privacy protection of blockchain transactions. The proposed techniques do not require the regulator to sign each transaction before each transaction is submitted. Accordingly, the proposed techniques do not rely on a central node and thus avoid the central node in the blockchain network becoming a bottleneck in system performance, security, etc.

FIG. 1 depicts an example environment 100 that can be used to execute implementations of the present disclosure. In some examples, the example environment 100 enables entities to participate in a consortium blockchain network 102. The example environment 100 includes computing devices or systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
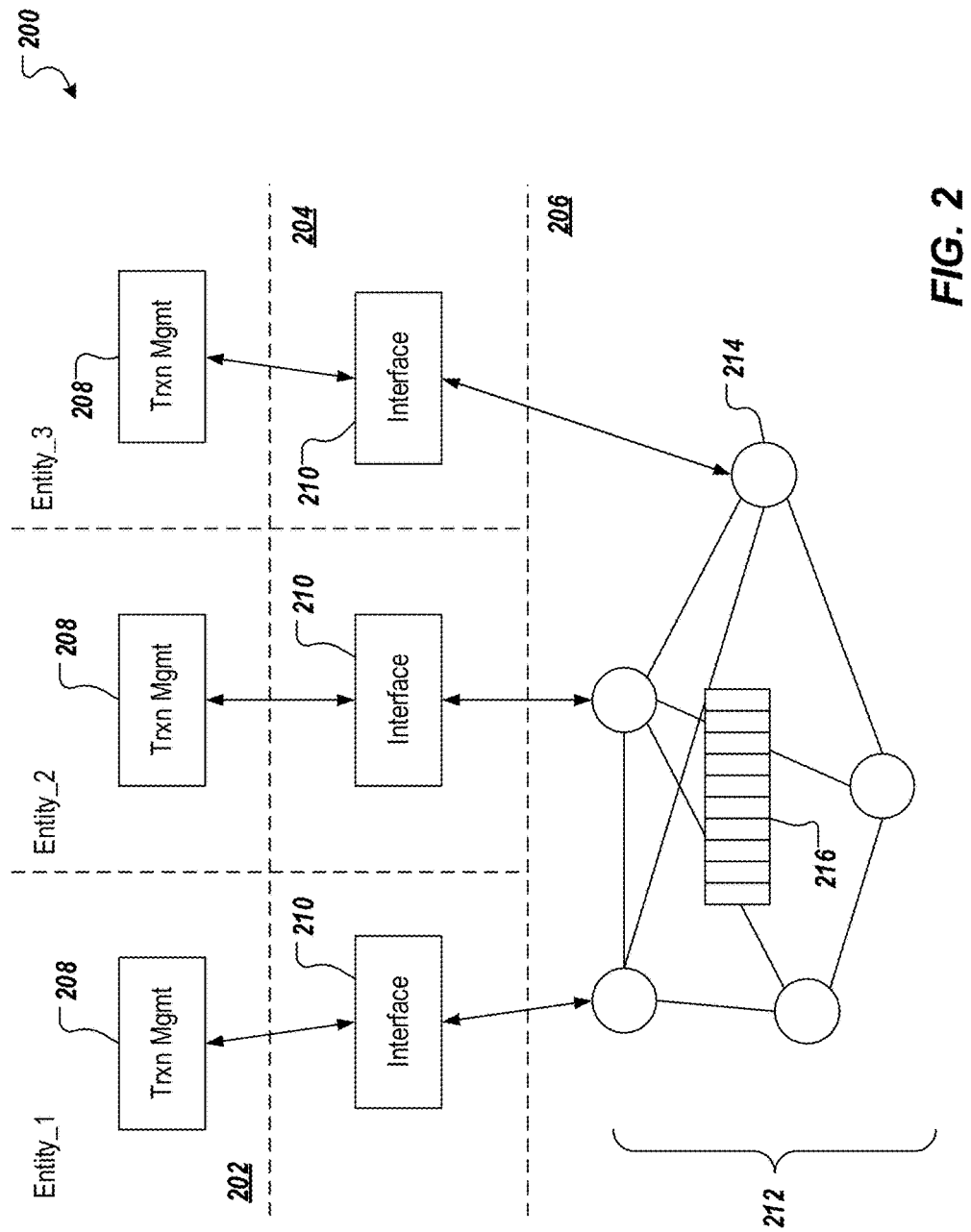
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

Figure 3:
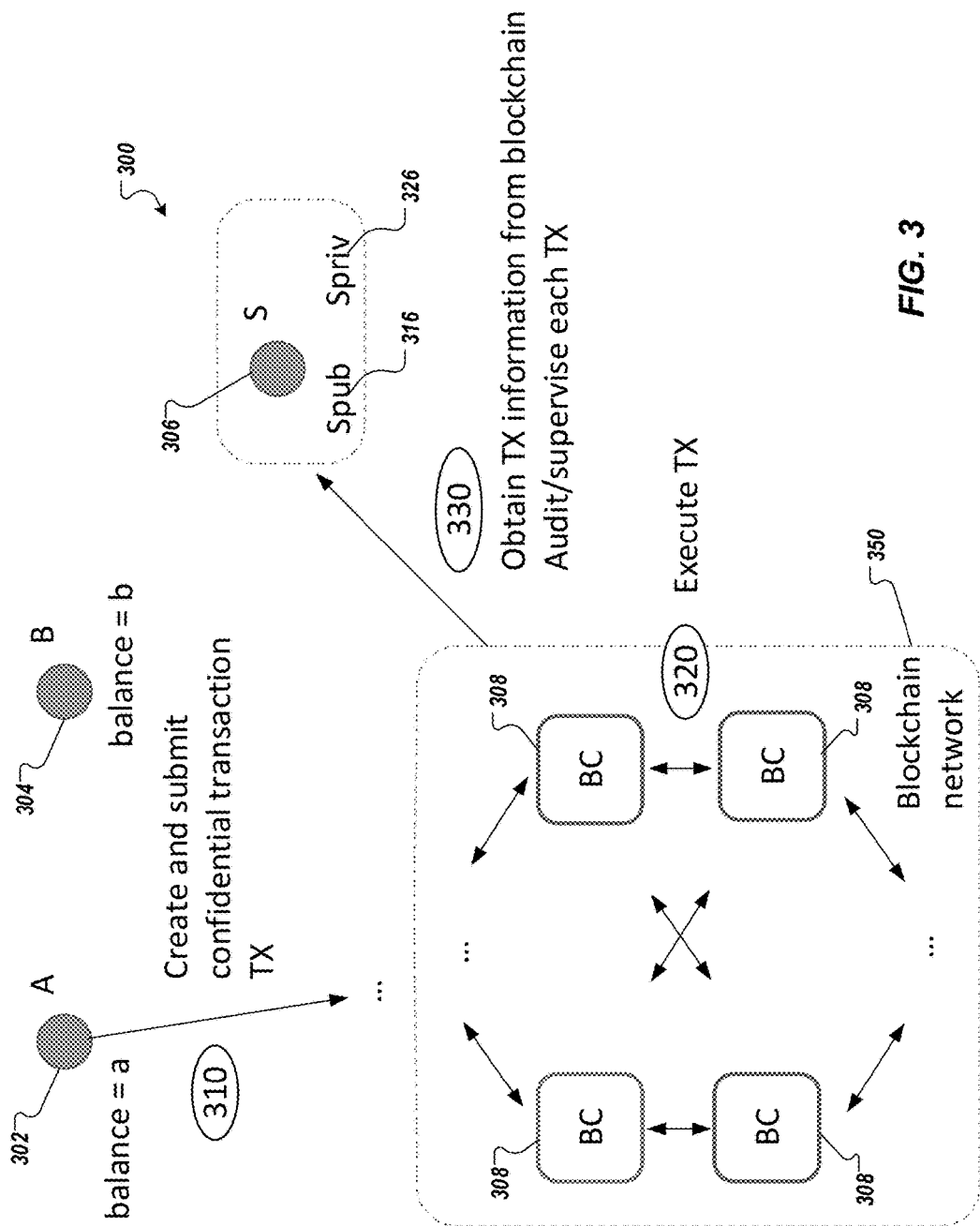
FIG. 3 depicts an example regulation process of a blockchain confidential transaction in accordance with implementations of the present disclosure.

FIG. 3 depicts an example regulation process 300 of a blockchain confidential transaction (transaction) in accordance with implementations of the present disclosure. A 302 and B 304 represent two client nodes of two users (also referred to as clients, entities, participants or parities) of a transaction and S 306 is a regulator (or supervisor) node in a blockchain network 350. The blockchain network 350 can include multiple consensus nodes (denoted as blockchain nodes 308 in FIG. 3).

In some implementations, A 302 and B 304 are examples of the computing systems 106, 108 corresponding to a first and second user or entity as described in FIGS. 1 and 2. Each client node A 302 or B 304 has a corresponding account (e.g., a public account or a private account) for transactions over the blockchain network 350.

In some implementations, client node A 302 can perform a confidential transaction with client node B 304 such that the transaction information is only viewable or otherwise known by client node A 302 and client node B 304, but not other parties (e.g., blockchain nodes 308) in the blockchain network 350.

In some implementations, some or all transactions performed in the blockchain network 350 may be subject to regulation by the regulator node S 306. For example, the regulator node S 306 can determine whether a particular transaction complies with certain rules or regulations by, for example, monitoring, inspecting, auditing, supervising, or otherwise regulating the transaction. In some implementations, transaction information of a confidential transaction may be made available and viewable by the regulator node S 306.

In some implementations, to have access to transaction information of a confidential transaction while keeping the privacy of the confidential transaction, the regulator node S 306 can generate a pair of keys, a public key Spub 316 and a private key Spriv 326. The regulator node S 306 can publish or issues the public key Spub 316 to client nodes (e.g., A 302 and B 304) in the blockchain network 350 so that a client node can use the public key Spub 316 to encrypt the transaction information. Because it is encrypted, the transaction information is not viewable by other third-parties but accessible to the regulator node S 306 because the regulator node S 306 can decrypt the encrypted transaction information using its private key Spriv 326.

For example, as shown in FIG. 3, before the transaction, client node A 302 has an account balance a and client node B 304 has an account balance b. At 310, client node A 302 creates a confidential transaction to transfer an amount t to client node B 304. In some implementations, client node A 302 can construct a content of the confidential transaction locally and submit the content of the confidential transaction to the blockchain network 350 (e.g., one or more blockchain node 308 in the blockchain network 350).

Figure 4:
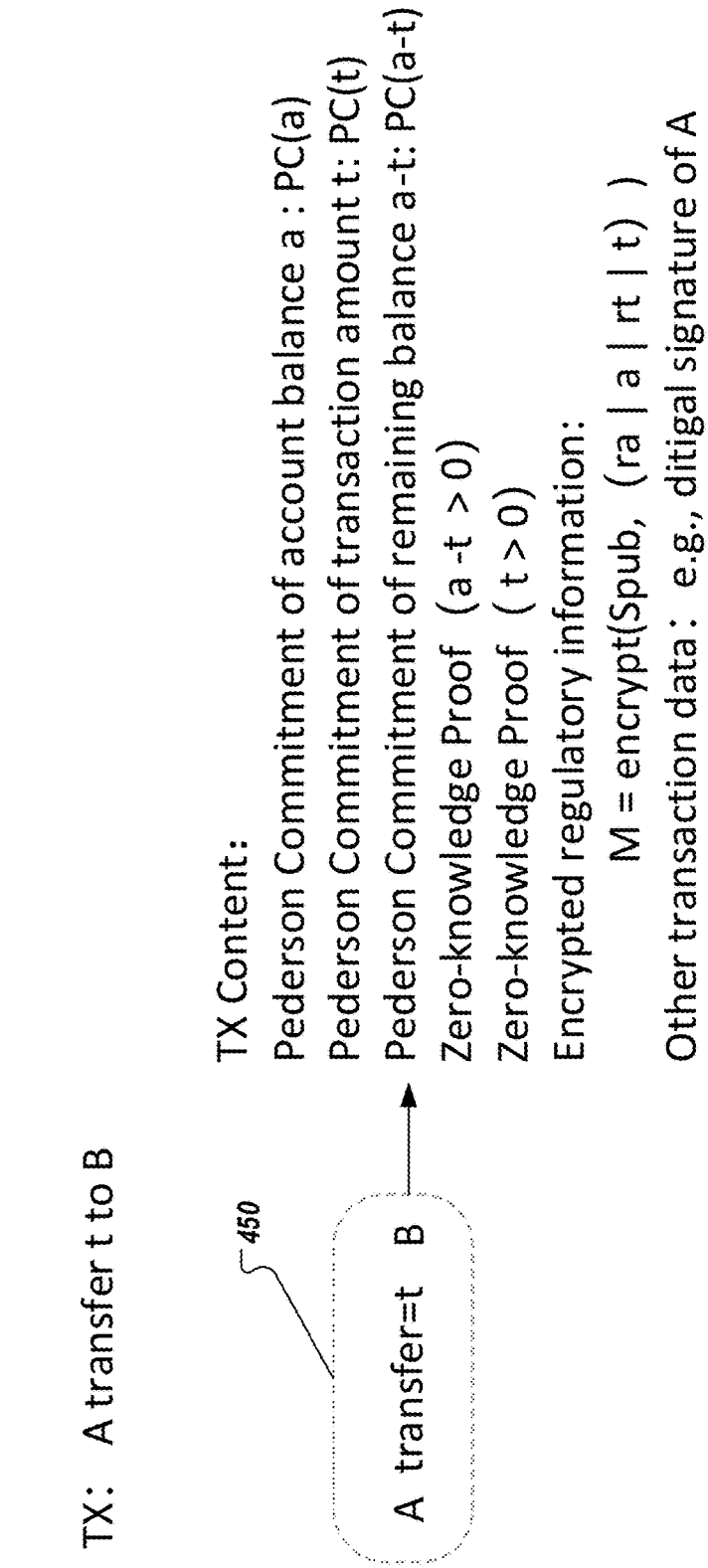
FIG. 4 depicts an example content of a blockchain confidential transaction in accordance with implementations of the present disclosure.

FIG. 4 depicts an example content 400 of an example confidential transaction 450 in accordance with implementations of the present disclosure. As illustrated, the example confidential transaction 450 is the transfer of a transaction amount t from client node A 302 to client node B 304 as described with respect to FIG. 3.

In some implementations, the confidential transaction 450 can be constructed based on a commitment scheme to conceal the transaction data (e.g., the account balance before the transaction and the transaction amount). An example commitment scheme includes, without limitation, the Pedersen Commitment (PC). For example, the client node A 302 generates a commitment value based on a transaction amount t and a random number r using the PC. For example, the commitment value includes a cypher text that can be obtained according to $PC(t)=rG+tH$, where G and H can be generators of an elliptical curve, PC(t) is a scalar multiplication of curve points, t is the value that is committed to. The PC commitment scheme has a homomorphism, that is, $PC(t_1)+PC(t_2)=PC(t_1+t_2)$. Holders of the cypher text PC(t) can verify the transaction amount t by using the random number r. Although implementations of the present disclosure are described in further detail herein with reference to the PC, it is contemplated that implementations of the present disclosure can be realized using any appropriate commitment scheme.

In the example confidential transaction 450, client node A 302 can commit to a pre-transaction account balance a and a transfer amount t. In some implementations, client node A 302 can generate a commitment value PC(a) using PC based on the pre-transaction account balance a and a corresponding random number ra. Similarly, client node A 302 can generate a commitment value PC(t) using PC based on the pre-transaction account balance a and a corresponding random number rt. In some implementations, client node A 302 can also commit that it has sufficient fund so that the post-transaction balance a-t is large than or equal to 0. For example, client node A 302 can generate a commitment value PC(a-t), for example, based on the commitment values PC(a) and PC(t) given the homomorphic property of the PC. The commitment values can be included in the content 400 of the example confidential transaction 450.

In some implementations, additional or different commitment values can be included. For example, client node A 302 can commit that it uses the public key of the regulator (e.g., the public key Spub 316) to encrypt the transaction information. For example, client node A 302 can generate a commitment value PC(Spub) based on Spub and the transaction information.

To facilitate the regulator's regulation, client node A 302 also can encrypt the transaction information, such as, amount a, t and corresponding random number ra, rt of each Pedersen Commitment involved in the transaction using the public key Spub of the regulator. For example, client node A 302 also can encrypt the transaction information (e.g., ra, a, rt, t) using the Spub and obtain encrypted regulatory information, e.g., a cipher text M denoted as encrypt (Spub, (ra|a|rt|t)). As an example, the cipher text M can be a concatenation of encrypted text of the four elements ra, a, rt, t, or in another format. In some implementations, the encrypted regulatory information can include additional or different transaction information and may be generated in another manner.

In some implementations, the content 400 of the example confidential transaction 450 can include one or more zero knowledge proofs to enable a receiving party to confirm that the information the sending party is sending is valid. The zero knowledge proofs enable the receiving party to do this without actual knowledge of the information being confirmed. The zero knowledge proofs can include range proof such as Proof (a-t>0), Proof (t>0), and Proof (a>0), or other types of proofs. The zero knowledge proofs enable the receiving party (e.g., client node B) to confirm that the sending party (e.g., client node A) has enough funds to transfer (i.e., a-t>0), and that the transfer amount is greater than zero, without knowing either the balance a from which the amount is being transferred, or even the transfer amount t.

In some implementations, the content 400 of the example confidential transaction 450 can include other transaction-related information, such as A's digital signature on the transaction.

Referring back to FIG. 3, after generating the transaction content (e.g., the content 400 of the example confidential transaction), client node A 302 can submit the content of the confidential transaction to the blockchain network 350 (e.g., one or more blockchain node 308 in the blockchain network 350). At 320, the blockchain network 350 can execute the confidential transaction. In some implementations, the confidential transaction can be executed by each of the blockchain node 308 in the blockchain network 350. For example, each of the blockchain node 308 can determine whether the content of the confidential transaction is legitimate, for example, by verifying one or more commitment values and zero knowledge proofs included in the content of the confidential transaction. For example, each of the blockchain node 308 can verify the commitment values by verifying $PC(a)=PC(t)+PC(a-t)$, that is, input transaction values is equal to output transaction values. Each of the blockchain node 308 can verify the zero knowledge proofs, for example, based on Bulletproofs, Monero's RingCT algorithms, or any other suitable algorithms.

Once the commitment values and zero knowledge proofs have been verified, each of the blockchain nodes 308 can record the transaction and update the accounts of client node A 302 and client node B 304. For example, after the transaction, client node A 302 has an account balance a-t and client node B 304 has an account balance b+t. In some implementations, the post-transaction balance of client node A 302 and client node B 304 can be reflected by the direct operations of the commitment value due to the homomorphism of the commitment scheme. For example, client node A 302 can now have a commitment value of a post-transaction account balance $PC(a-t)=PC(a)-PC(t)$. Client node B 304 can now have a commitment value of a post-transaction account balance $PC(b+t)=PC(b)+PC(t)$.

At 330, to regulate the confidential transaction, the regulator node S 306 obtains the content of the confidential transaction from the blockchain network 350 and determine whether transaction information meets regulatory criteria or requirements. For example, the regulator node 306 can obtain the content of the confidential transaction that contains encrypted regulatory information (e.g., a cipher text M=encrypt (Spub, (ra|a|rt|t)) as shown in FIG. 4). The regulator node S 306 uses its private key Spriv 326 to decrypt the encrypted regulatory information and obtains the plaintext transaction information (e.g., ra, a, rt, t) corresponding to the PCs in the transaction. The regulator node S 306 can determine whether transaction information meets regulatory criteria or requirements, verify the validity of the commitment values based on the plaintext transaction information. For example, the regulator node S 306 can perform traditional regulation such as determining whether the transaction amount is below a maximum permitted transaction amount.

In some implementations, the regulator node S 306 can subscribe to some or all transactions performed in the blockchain network 350 so that transaction data of the transactions can be pushed to the regulator node S 306 automatically. In some implementations, the regulator node S 306 can fetch, pull, or obtain transaction data of the some or all transaction from the blockchain network 350 (e.g., from one or more blockchain node 308 in the blockchain network 350).

Figure 5:
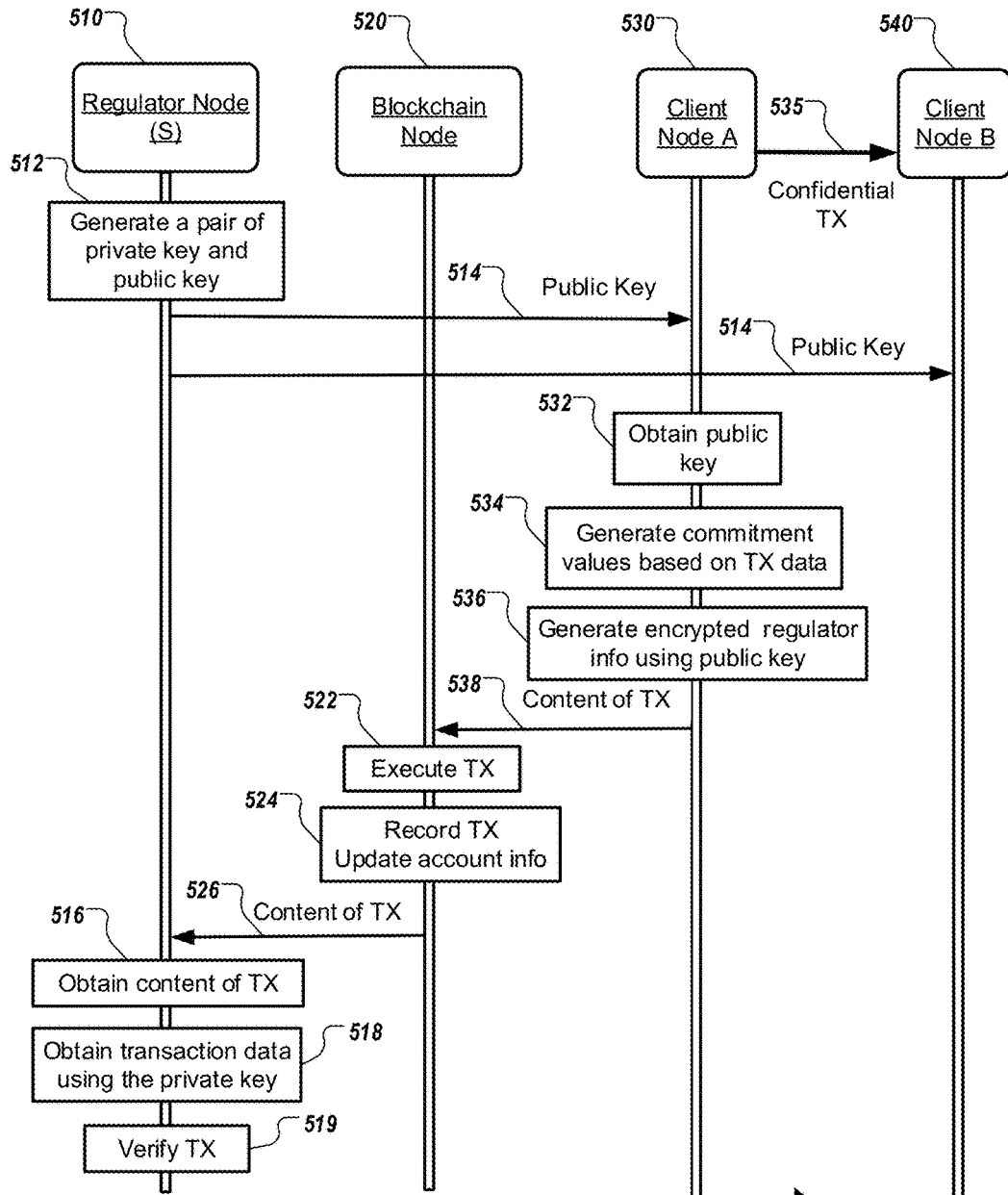
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. For clarity of presentation, the description that follows generally describes method 500 in the context of the other figures in this description. For example, the regulator node 510 can be the regulator node S 306, the blockchain node 520 can be the blockchain node 308, client node A 530 can be client node A 302, and client node B 540 can be client node B 304 as described with respect to FIG. 3. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order.

At 512, the regulator node 510 of a blockchain network generates a pair of a public key and a private key. The pair of the public key and the private key can be used for encrypting and decrypting transaction information for regulation.

At 514, the regulator node 510 publishes the public key to a plurality of client nodes (e.g., client node A 530 and client node B 540) of the blockchain network. For example, the regulator node 510 can issue the public key to all client nodes in the blockchain network (e.g., a consortium blockchain network) that are subject to the regulator node's regulation.

At 532, client node A 530, a client node of the blockchain network, obtains the public key of the regulator node 510. The client node A 530 can use the public key of the regulator node 510 to encrypt transaction data subject to regulation, thereby allowing the regulator node 510 to decrypt the transaction data using the private key corresponding to the public key.

The client node A 530 can prepare for a confidential transaction 535, such as a transfer of an amount of fund from an account of the client node A 530 to an account of client node B 540, another client node of the blockchain network. The client node A 530 can construct the content of the confidential transaction to protect privacy of transaction data and conceal the transaction data from inspection by other entities except the participants of the transaction (i.e., client node A 530 and client node B 540 in this example) and the regulator node 510. In some implementations, the client node A 530 can conceal the transaction data of the confidential transaction based on a commitment scheme.

In some implementations, the transaction data of the confidential transaction includes one or both of an account balance of the client node A 530 before the confidential transaction or a transaction amount of the confidential transaction. In some implementations, the transaction data of the confidential transaction can include additional transaction information (e.g., time of the transaction, parties of the transaction, asset type (e.g., stock security or another type)).

At 534, the client node A 530 generates one or more commitment values of the confidential transaction of the client node A 530 by applying a cryptographic commitment scheme to transaction data of the confidential transaction. In some implementations, the cryptographic commitment scheme includes a homomorphic cryptographic commitment scheme, such as, a Pedersen Commitment scheme, or another type of commitment scheme.

At 536, the client node A 530 generates encrypted regulatory information of the confidential transaction by encrypting the transaction data using the public key of the regulator node 510, wherein the encrypted regulatory information is configured to allow decryption by the regulator node 510 using the private key corresponding to the public key.

In some implementations, the cryptographic commitment scheme includes the Pedersen Commitment scheme. In this case, generating one or more commitment values of a confidential transaction of the client node A 530 by applying a cryptographic commitment scheme to transaction data includes generating the one or more commitment values of the confidential transaction of the client node A 530 based on the transaction data and random numbers corresponding to the transaction data; and generating encrypted regulatory information of the confidential transaction includes generating encrypted regulatory information of the confidential transaction by encrypting the transaction data and random numbers corresponding to the transaction data using the public key of the regulator node.

At 538, the client node A 530 submits the content of the confidential transaction to the blockchain network for execution, for example, by transmitting the content of the confidential transaction to the blockchain node 520 (e.g., a consensus node of the blockchain network). In some implementations, the content of the confidential transaction can include: the one or more commitment values of the confidential transaction generated by the client node A 530 by applying the cryptographic commitment scheme to transaction data of the confidential transaction; the encrypted regulatory information generated by the client node A 530 by encrypting the transaction data using the public key of the regulator node S 510; and one or more zero-knowledge proofs of the transaction data.

In some implementations, the one or more zero-knowledge proofs of the transaction data includes one or more zero-knowledge range proofs that values of the transaction data are within respective ranges. For example, the one or more zero-knowledge range proofs can include a zero-knowledge range proof that the account balance of the client node A 530 before the confidential transaction is larger than zero, a zero-knowledge range proof that the transaction amount of the confidential transaction is larger than zero, and a zero-knowledge range proof that the transaction amount is less than or equal to the account balance of the client node A 530 before the confidential transaction.

In some implementations, the one or more zero-knowledge proofs of the transaction data includes a zero-knowledge proof that the client node A 530 uses the public key of the regulator node 510 in generating the encrypted regulatory information of the confidential transaction.

In some implementations, the content of the confidential transaction further includes a digital signature of the client node A 530. In some implementations, the content of the confidential transaction can include additional or different information.

At 522, upon receiving the content of the confidential transaction, the blockchain node 520 can execute the confidential transaction, for example, by verifying that the confidential transaction is valid based on the content of the confidential transaction. In some implementations, verifying that the confidential transaction is valid based on the content of the confidential transaction can include one or more of:

determining that the one or more commitment values are correct based on the commitment scheme and/or the one or more zero-knowledge proofs; or verifying the one or more zero-knowledge proofs of the transaction data, for example, according to algorithms as described with respect to FIG. 3.

At 524, after verifying the confidential transaction is valid, the blockchain node 520 can, for example, record the transaction (e.g., by storing the content of the confidential transaction in a blockchain on the blockchain network), and update account information effected by the confidential transaction (e.g., the account balance of the client node A 530 and client node B 540), for example, according to the techniques described with respect to FIG. 3 or other techniques.

At 516, the regulator node 510 obtains from the blockchain node 520 (e.g., a consensus node of the blockchain network) the content of the confidential transaction of the client node A 530. The content of the confidential transaction can include the example content 400 of the example confidential transaction 450 as described with respect to FIG. 4.

At 518, the regulator node 510 obtains the transaction data by decrypting the encrypted regulatory information using the private key of the regulator node.

At 519, the regulator node 510 verifies that the confidential transaction is legitimate based on the content of the confidential transaction and the transaction data. In some implementations, verifying that the confidential transaction is valid based on the content of the confidential transaction and the decrypted transaction data includes one or more of: determining that the one or more commitment values are correct based on the commitment scheme and/or the one or more zero-knowledge proofs; verifying the one or more zero-knowledge proofs of the transaction data; or determining that values of the transaction data comply with regulation.

In some implementations, verifying that one or more zero-knowledge proofs of the transaction data includes one or more of: determining that the account balance of the client node A 530 before the confidential transaction is larger than zero; determining that the transaction amount of the confidential transaction is larger than zero; or determining that a transaction amount of the confidential transaction is less than or equal to the account balance of the client node A 530 before the confidential transaction.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

The invention claimed is:

1. A computer-implemented method of a client node participating in a blockchain confidential transaction, the method comprising:
   obtaining, by a client node of a blockchain network, a public key of a regulator node;

generating, by the client node, one or more commitment values of a confidential transaction of the client node by applying a cryptographic commitment scheme to transaction data of the confidential transaction;

generating, by the client node, encrypted regulatory information of the confidential transaction by encrypting the transaction data using the public key of the regulator node; and transmitting, by the client node to a consensus node of the blockchain network, a content of the confidential transaction for execution, wherein the content of the confidential transaction comprises:
- the one or more commitment values;
- the encrypted regulatory information; and
- one or more zero-knowledge proofs of the transaction data.

2. The method of claim 1, wherein the transaction data of the confidential transaction comprises one or both of an account balance of the client node before the confidential transaction or a transaction amount of the confidential transaction.

3. The method of claim 1, wherein the one or more zero-knowledge proofs of the transaction data comprises one or more zero-knowledge range proofs that values of the transaction data are within respective ranges.

4. The method of claim 1, wherein the one or more zero-knowledge proofs of the transaction data comprises a zero-knowledge proof that the client node uses the public key of the regulator node in generating the encrypted regulatory information of the confidential transaction.

5. The method of claim 1, wherein the cryptographic commitment scheme comprises a Pedersen Commitment scheme;
wherein generating one or more commitment values of a confidential transaction of the client node by applying a cryptographic commitment scheme to transaction data comprises generating the one or more commitment values of the confidential transaction of the client node based on the transaction data and random numbers corresponding to the transaction data; and
wherein generating encrypted regulatory information of the confidential transaction comprises generating encrypted regulatory information of the confidential transaction by encrypting the transaction data and random numbers corresponding to the transaction data using the public key of the regulator node.

6. The method of claim 1, wherein the content of the confidential transaction further comprises a digital signature of the client node.

7. A computer-implemented method for regulating blockchain confidential transactions, the method comprising:
generating, by a regulator node of a blockchain network, a pair of a public key and a private key;
publishing, by the regulator node, the public key to a plurality of client nodes of the blockchain network;
obtaining, by the regulator node from a consensus node of the blockchain network, a content of a confidential transaction of a client node, wherein the content of the confidential transaction comprises:
- one or more commitment values of the confidential transaction generated by the client node by applying a cryptographic commitment scheme to transaction data of the confidential transaction;
- one or more zero-knowledge proofs of the transaction data; and
- encrypted regulatory information generated by the client node by encrypting the transaction data using the public key of the regulator node;

obtaining the transaction data by decrypting the encrypted regulatory information using the private key of the regulator node; and
verifying, by the regulator node, that the confidential transaction is legitimate based on the content of the confidential transaction and the decrypted transaction data.

8. The method of claim 7, wherein the transaction data of the confidential transaction comprises one or more of an account balance of the client node before the confidential transaction, or a transaction amount of the confidential transaction.

9. The method of claim 7, wherein the one or more zero-knowledge proofs of the transaction data comprises one or more zero-knowledge range proofs that values of the transaction data are within respective ranges.

10. The method of claim 7, wherein verifying that the confidential transaction is valid based on the content of the confidential transaction and the decrypted transaction data comprises one or more of:
- determining that the one or more commitment values are correct based on the commitment scheme;
- verifying the one or more zero-knowledge proofs of the transaction data; or
- determining that values of the transaction data comply with regulation.

11. The method of claim 10, wherein verifying the one or more zero-knowledge proofs of the transaction data comprises one or more of:
- determining that an account balance of the client node before the confidential transaction is larger than zero;
- determining that a transaction amount of the confidential transaction is larger than zero; and
- determining that a transaction amount of the confidential transaction is less than or equal to an account balance of the client node before the confidential transaction.

12. A non-transitory, computer-readable medium storing one or more instructions executable by a computer system to perform operations comprising:
obtaining, by a client node of a blockchain network, a public key of a regulator node;
generating, by the client node, one or more commitment values of a confidential transaction of the client node by applying a cryptographic commitment scheme to transaction data of the confidential transaction;
generating, by the client node, encrypted regulatory information of the confidential transaction by encrypting the transaction data using the public key of the regulator node; and
transmitting, by the client node to a consensus node of the blockchain network, a content of the confidential transaction for execution, wherein the content of the confidential transaction comprises:
- the one or more commitment values;
- the encrypted regulatory information; and
- one or more zero-knowledge proofs of the transaction data.

13. The non-transitory, computer-readable medium of claim 12, wherein the transaction data of the confidential transaction comprises one or both of an account balance of the client node before the confidential transaction or a transaction amount of the confidential transaction.

14. The non-transitory, computer-readable medium of claim 12, wherein the one or more zero-knowledge proofs of the transaction data comprises one or more zero-knowledge range proofs that values of the transaction data are within respective ranges.

15. The non-transitory, computer-readable medium of claim 12, wherein the one or more zero-knowledge proofs of the transaction data comprises a zero-knowledge proof that the client node uses the public key of the regulator node in generating the encrypted regulatory information of the confidential transaction.

16. The non-transitory, computer-readable medium of claim 12, wherein the cryptographic commitment scheme comprises a Pedersen Commitment scheme;

wherein generating one or more commitment values of a confidential transaction of the client node by applying a cryptographic commitment scheme to transaction data comprises generating the one or more commitment values of the confidential transaction of the client node based on the transaction data and random numbers corresponding to the transaction data; and wherein generating encrypted regulatory information of the confidential transaction comprises generating encrypted regulatory information of the confidential transaction by encrypting the transaction data and random numbers corresponding to the transaction data using the public key of the regulator node.

17. The non-transitory, computer-readable medium of claim 12, wherein the content of the confidential transaction further comprises a digital signature of the client node.

18. A system, comprising:
one or more computers; and
one or more computer-readable memories coupled to the one or more computers and having instructions stored thereon which are executable by the one or more computers to:
  obtaining, by a client node of a blockchain network, a public key of a regulator node;
  generating, by the client node, one or more commitment values of a confidential transaction of the client node by applying a cryptographic commitment scheme to transaction data of the confidential transaction;
  generating, by the client node, encrypted regulatory information of the confidential transaction by encrypting the transaction data using the public key of the regulator node; and
  transmitting, by the client node to a consensus node of the blockchain network, a content of the confidential transaction for execution, wherein the content of the confidential transaction comprises:
    the one or more commitment values;
    the encrypted regulatory information; and
    one or more zero-knowledge proofs of the transaction data.

19. The system of claim 18, wherein the transaction data of the confidential transaction comprises one or both of an account balance of the client node before the confidential transaction or a transaction amount of the confidential transaction.

20. The system of claim 18, wherein the one or more zero-knowledge proofs of the transaction data comprises one or more zero-knowledge range proofs that values of the transaction data are within respective ranges.

* * * * *